United States Patent
Deppermann et al.

(10) Patent No.: US 7,673,572 B2
(45) Date of Patent: Mar. 9, 2010

(54) CUSTOM PLANTER AND METHOD OF CUSTOM PLANTING

(75) Inventors: Kevin Deppermann, St. Charles, MO (US); Sam Stehling, Monmouth, IL (US)

(73) Assignee: Monsanto Technology LLC, St. Louis, MO (US)

( * ) Notice: Subject to any disclaimer, the term of this patent is extended or adjusted under 35 U.S.C. 154(b) by 678 days.

(21) Appl. No.: 11/429,664

(22) Filed: May 5, 2006

(65) Prior Publication Data

US 2006/0278143 A1 Dec. 14, 2006

Related U.S. Application Data

(60) Provisional application No. 60/679,122, filed on May 9, 2005.

(51) Int. Cl.
*A01C 15/00* (2006.01)
(52) U.S. Cl. .................. 111/200; 111/900; 111/923
(58) Field of Classification Search ............. 111/200, 111/900, 903, 904, 923, 178, 179
See application file for complete search history.

(56) References Cited

U.S. PATENT DOCUMENTS

| 4,407,371 | A | 10/1983 | Hohl |
| 4,771,713 | A | 9/1988 | Kinzenbaw |
| 5,170,730 | A | 12/1992 | Swallow |
| 5,535,917 | A | 7/1996 | Ribouleau |
| 5,913,915 | A | 6/1999 | McQuinn |
| 5,915,313 | A * | 6/1999 | Bender et al. ............... 111/178 |
| 6,070,538 | A | 6/2000 | Flamme et al. |
| 6,474,500 | B1 | 11/2002 | Carr et al. |
| 6,615,754 | B2 | 9/2003 | Unruh et al. |
| 6,672,228 | B1 | 1/2004 | Groelz et al. |
| 7,174,839 | B2 * | 2/2007 | Tsing ......................... 111/179 |
| 2002/0062771 | A1 | 5/2002 | Unruh et al. |
| 2006/0243179 | A1 | 11/2006 | Landphair |

FOREIGN PATENT DOCUMENTS

| CL | 233-92 | 3/1992 |
| DE | 1457765 B1 | 12/1969 |
| DE | 3917438 C1 | 10/1990 |
| DE | 29718303 U1 | 1/1998 |
| EP | 0636305 | 2/1995 |
| WO | WO-2006/121973 | 11/2006 |

* cited by examiner

*Primary Examiner*—Christopher J. Novosad
(74) *Attorney, Agent, or Firm*—James E. Davis; Joseph A. Schaper; Harness, Dickey & Pierce, P.L.C.

(57) ABSTRACT

A method of planting test plots of different seeds in a field includes loading a multi-row planter with a first seed, and traversing the field and planting a test plot of the test plot of the first seed in a portion of the test field; automatically removing the first seed from the multi-row planter and loading a second seed into the multi-row planter, and traversing the field and planting a test plot of the test plot of the second seed in the field.

31 Claims, 22 Drawing Sheets

CUSTOM PLANTER AND METHOD OF CUSTOM PLANTING

CROSS-REFERENCE TO RELATED APPLICATIONS

This application claims the benefit of U.S. Provisional Patent Application Ser. No. 60/679,122, filed May 9, 2005, the entire disclosure of which is incorporated herein by reference.

BACKGROUND OF THE INVENTION

This invention relates to planters and methods of planting, and in particular to planters for, and methods of, planting custom plots with different types of seeds.

Modern planters have developed to the point where they can reliably simultaneously plant twelve or more rows as the planter traverses a field. With such planters large fields can be quickly planted. However, with existing planters it can be difficult to plant small plots, such as are planted during seed tests. When it is desired to plant small plots of different types of seeds, for example when planting test plots of different seed varieties, seeds of a first variety must be loaded into the hoppers of the individual planting units on the planter, and the planter traversed across the field to plant a first plot. After the first plot is completed, the planter must be stopped so that the first variety of seeds can be manually removed from the hoppers and a new variety of seed loaded in the hopper. This process must be repeated each time a plot of a new variety of seed is desired.

When planting test plots, relatively skilled personnel are typically involved in either performing or supervising the complex task of manually changing the seeds in the planters, to ensure that the proper seeds are used. For widespread field testing, skilled personal must be widely deployed, wasting valuable time and increasing costs.

SUMMARY OF THE INVENTION

Embodiments of planters of the present invention provide a planter that facilitates planting of plots of different types of seeds, as is often done in planting test plots of different seeds, and which may become more popular as farmers try to match the seed variety being planted with local conditions within a field. Similarly, embodiments of the methods of the present invention provide for the planting of plots of different seeds, for example for testing purposes or for matching the type of seeds being planted with the local conditions within a field.

A preferred embodiment of a planter constructed according to the principles of this invention comprises a planter with a plurality of individual planter units. These planter units can be mounted on extensible booms that can be stowed when not in use to facilitate moving and storing the planter. The planter also preferably includes a storage system for separately storing two or more varieties of seeds. A transfer system transfers seed between the storage system and the individual planter units.

A preferred embodiment of a method of planting according to the principles of this invention comprises preparing a predetermined planting plan, loading the seeds for the predetermined plan into a storage unit on the planter; transferring seeds for a test plot from the storage system to the individual planter units; and traversing the a field with the planter to plant the seeds in a test plot. Upon completion of a test plot, the unplanted seeds left over are transferred from the individual planter units to the storage system. If there is another test plot to plant according to the predetermined plan, then the seeds for the next test plot are transferred from the storage system to the individual planter units.

Various embodiments of planters in accordance with the principles of this invention provide for the fast and automatic change of the seeds in the individual units, facilitating the planting of plots of different types of seeds in the same field. Various embodiments of the planting methods of the present invention provide for the organized planting of plots of different types of seeds in the same field, with a minimum of field supervision, freeing skilled personal from manual labor to concentrate on the design of planting plans and other more important tasks. Various embodiments of the planter and method facilitate the automation of the entire planting process from the distribution of seeds, the loading of the planters, to the planting of plots. The principles of this invention have applicability both to small test plots for seed testing, and to customized production planting of precision agriculture. These and other features and advantages will be in part apparent and in part pointed out hereinafter.

BRIEF DESCRIPTION OF THE DRAWINGS

Corresponding reference numerals indicate corresponding parts throughout the several views of the drawings.

DETAILED DESCRIPTION OF THE PREFERRED EMBODIMENTS

Figure 1:
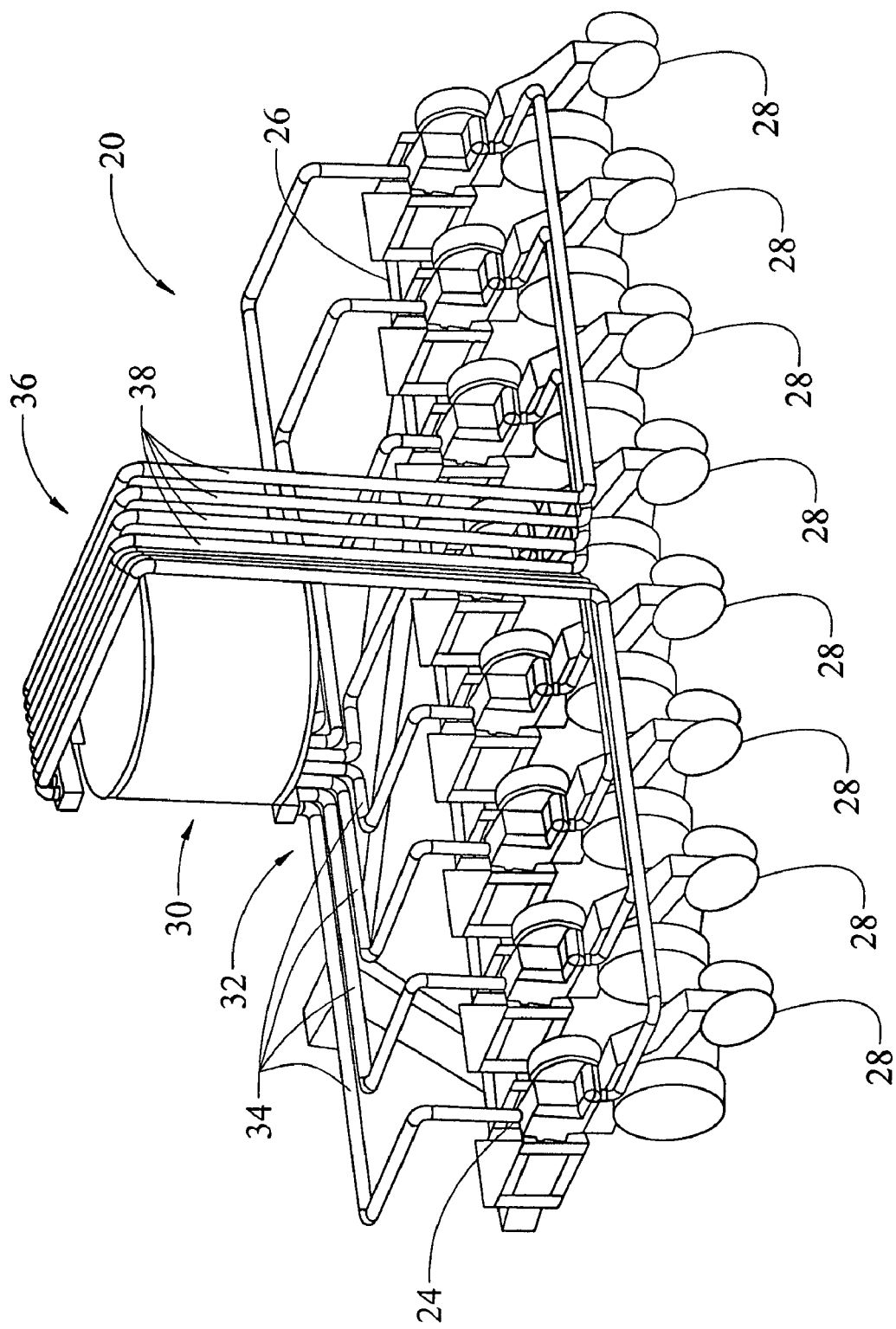
FIG. 1 is a schematic diagram of a preferred embodiment of a planter constructed in accordance with the principles of this invention.
Figure 2:
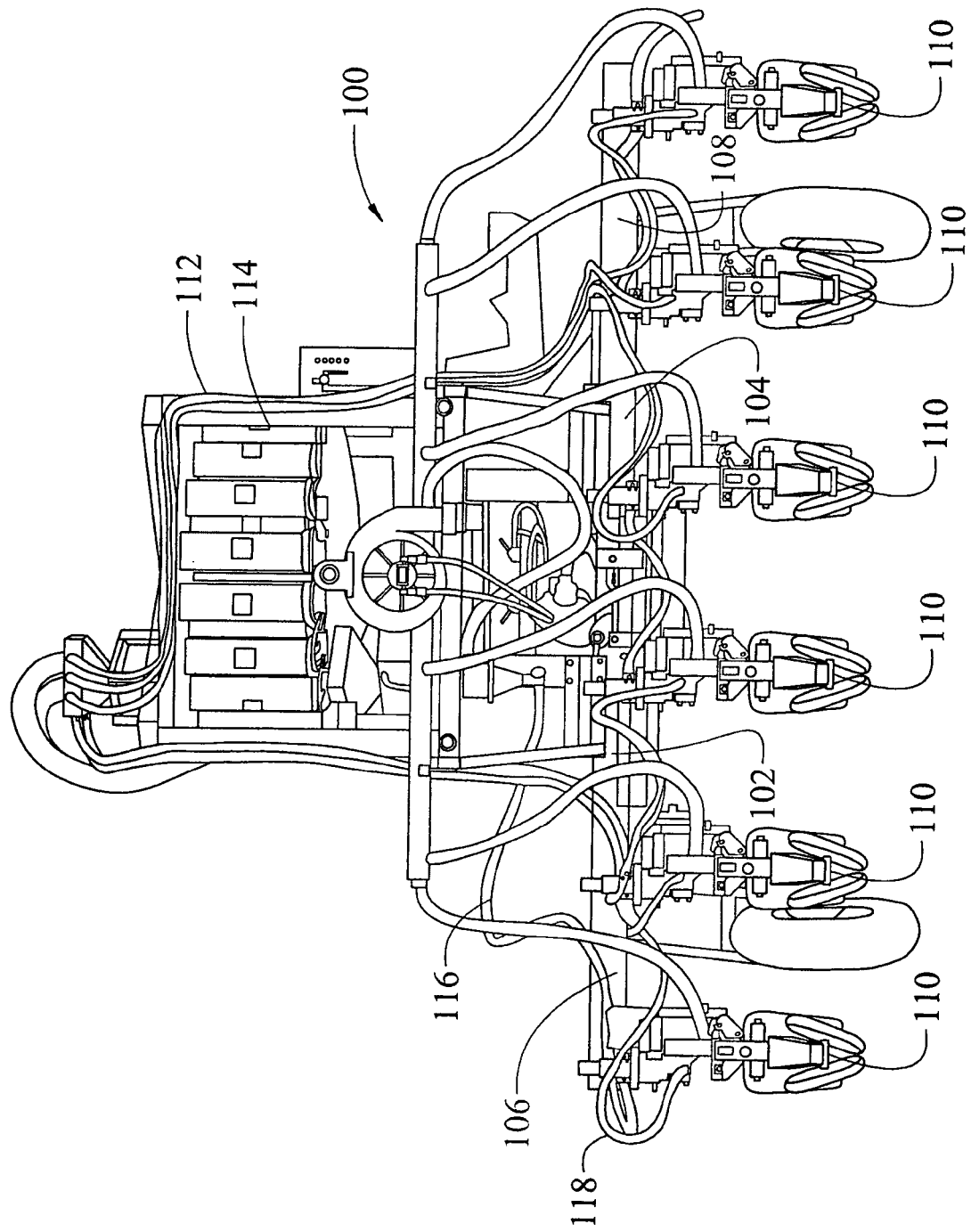
FIG. 2 is a rear elevation view of a preferred embodiment of a planter in accordance with the principles of this invention.
Figure 3:
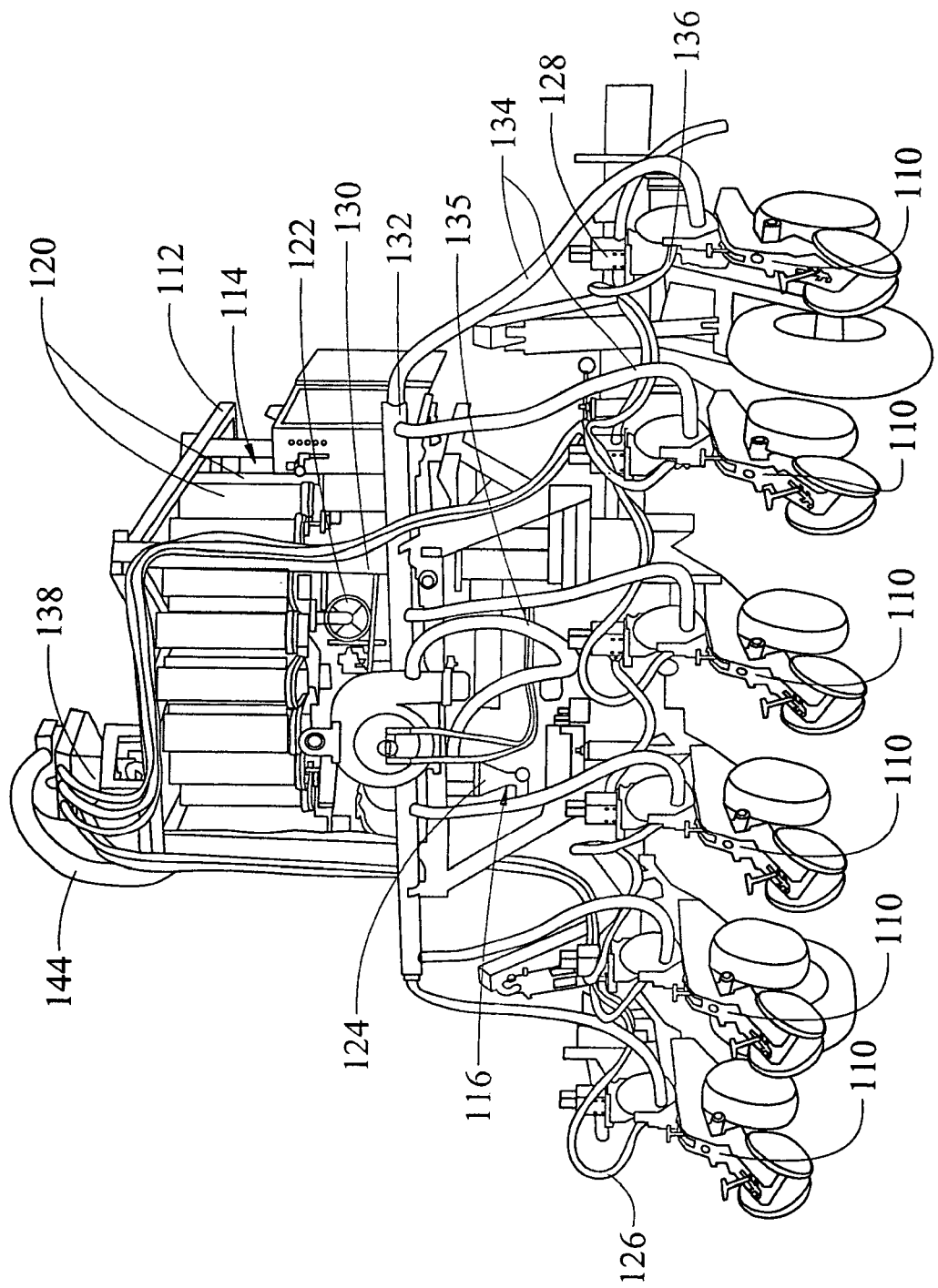
FIG. 3 is a rear perspective view of the preferred embodiment of the planter shown in FIG. 2.
Figure 4:
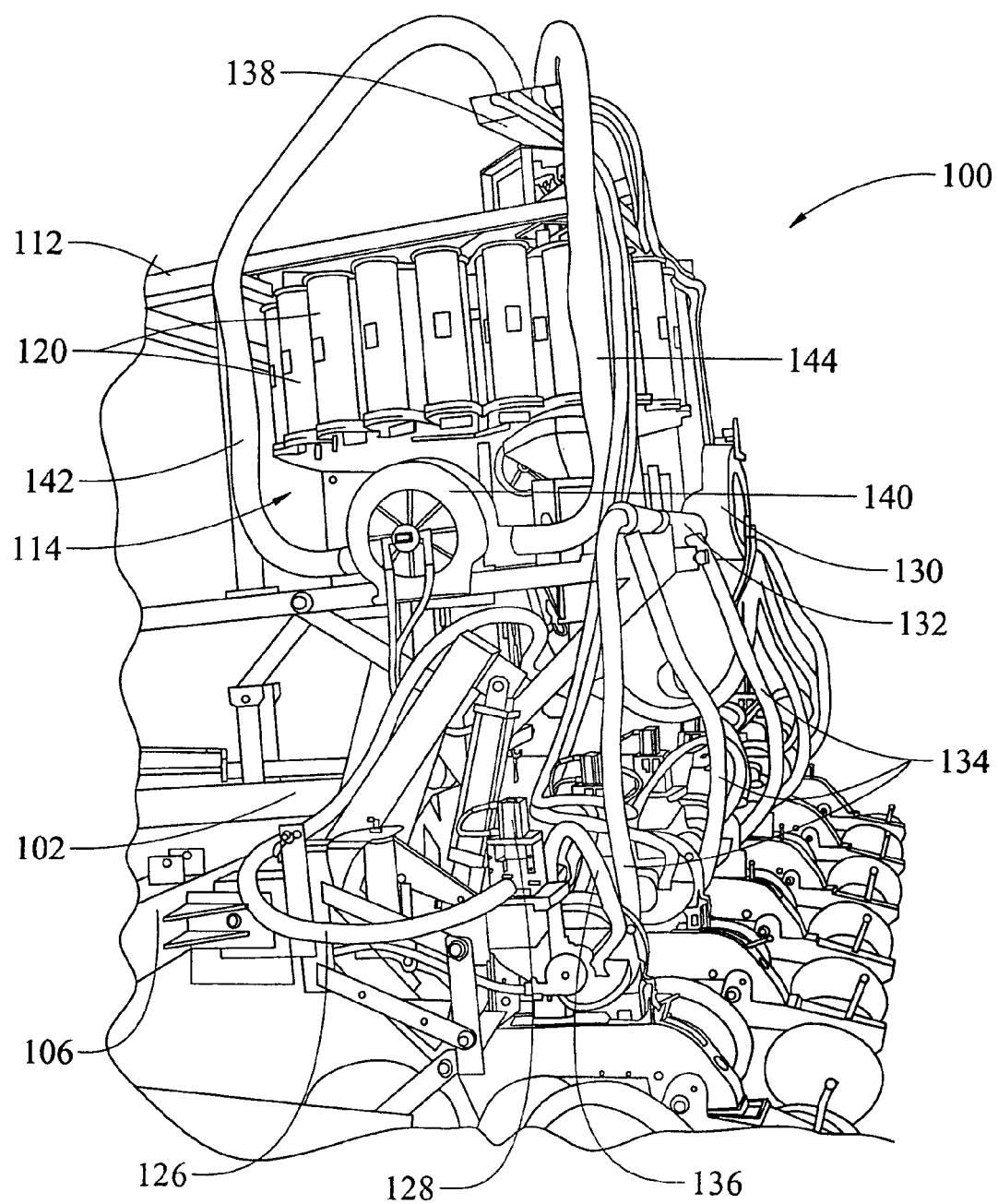
FIG. 4 is a right side elevation view of the planter shown in FIG. 2.
Figure 5:
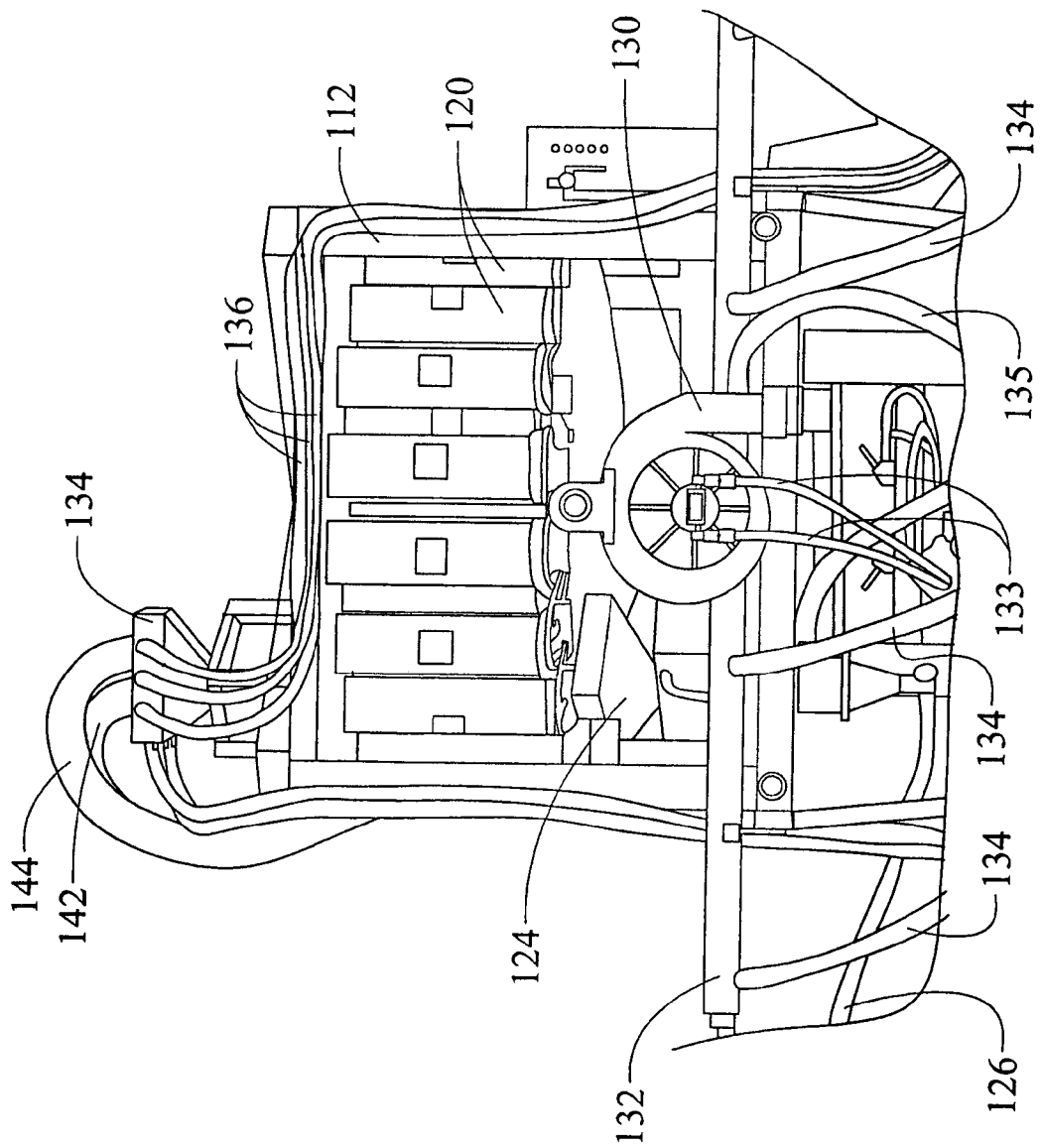
FIG. 5 is a rear elevation view of the storage device on the planter shown in FIG. 2.
Figure 6:
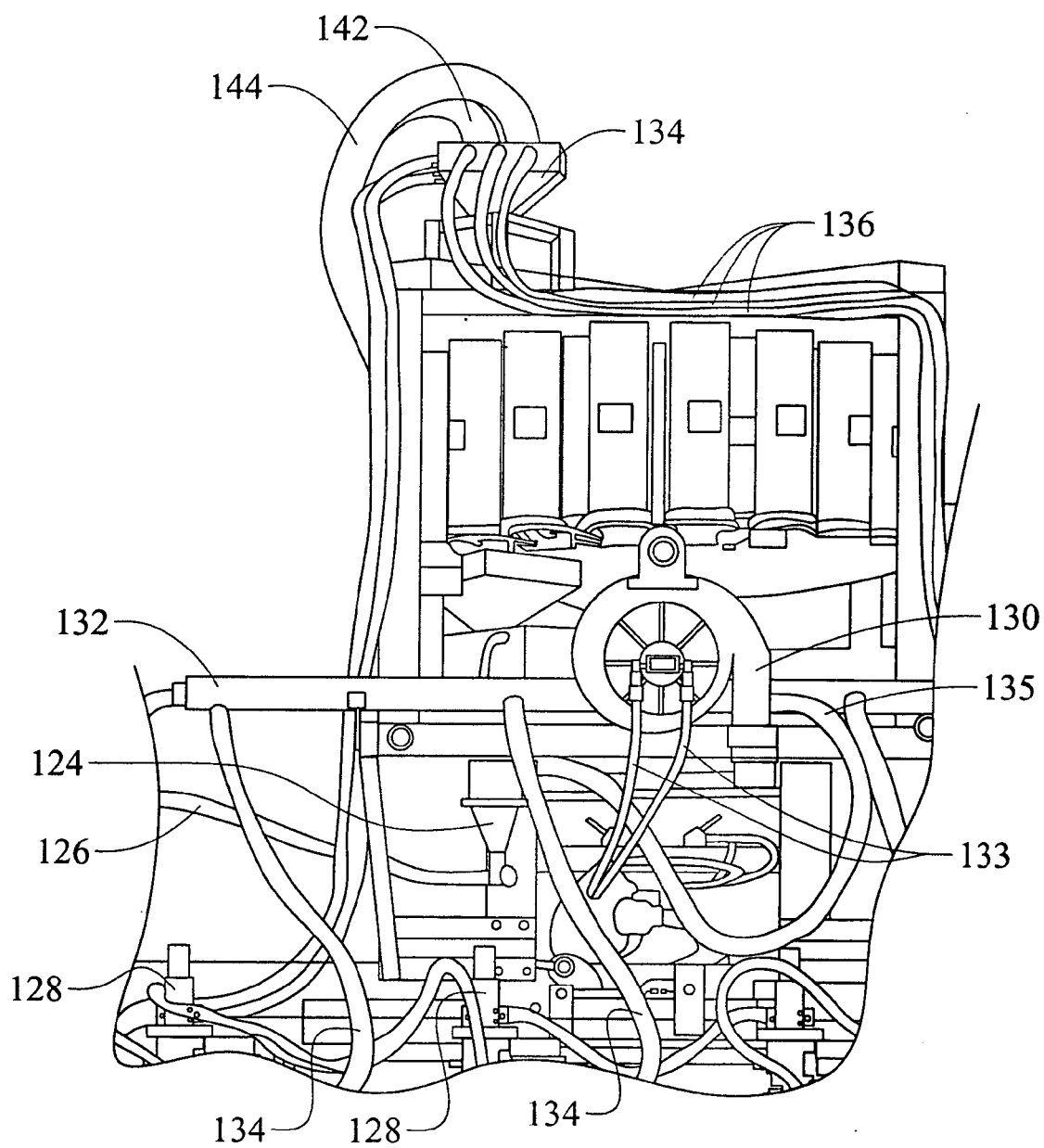
FIG. 6 is a rear elevation view of the mechanism for unloading the storage device on the planter shown in FIG. 2.
Figure 7:
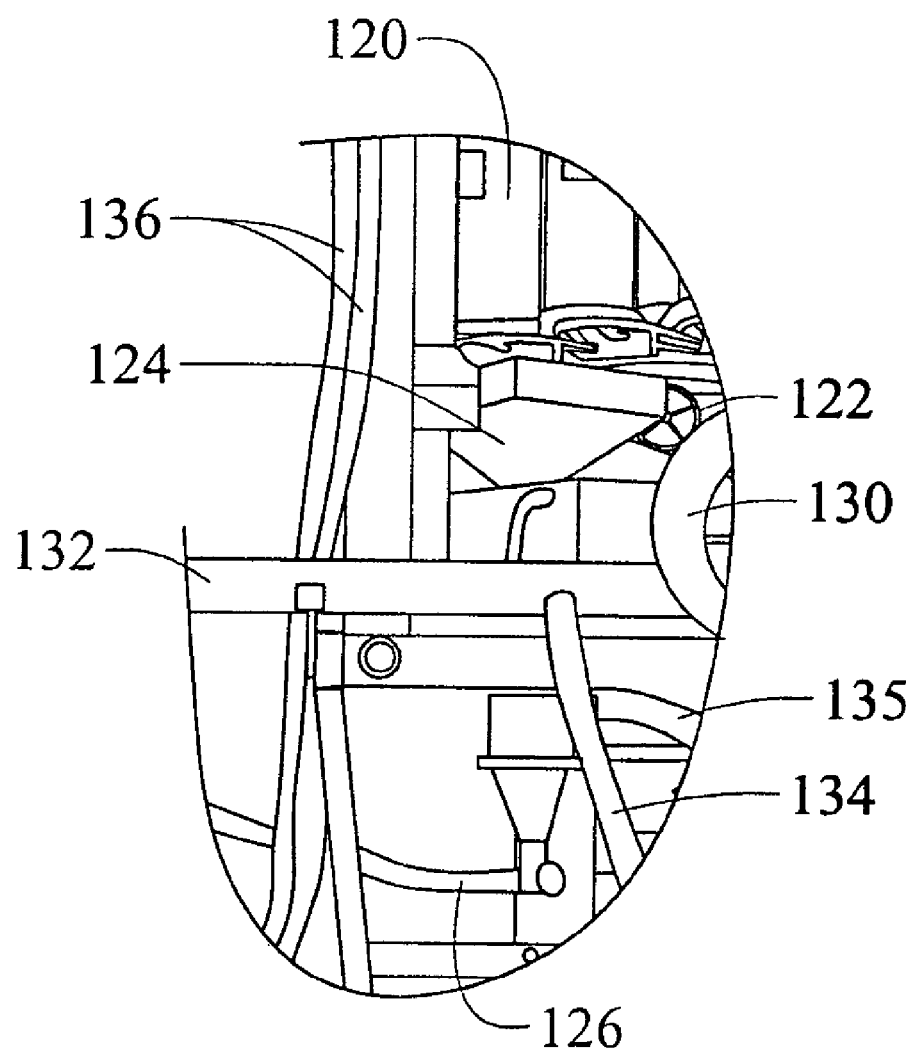
FIG. 7 is a rear elevation view of the mechanism for unloading the storage device on the planter shown in FIG. 2.
Figure 8:
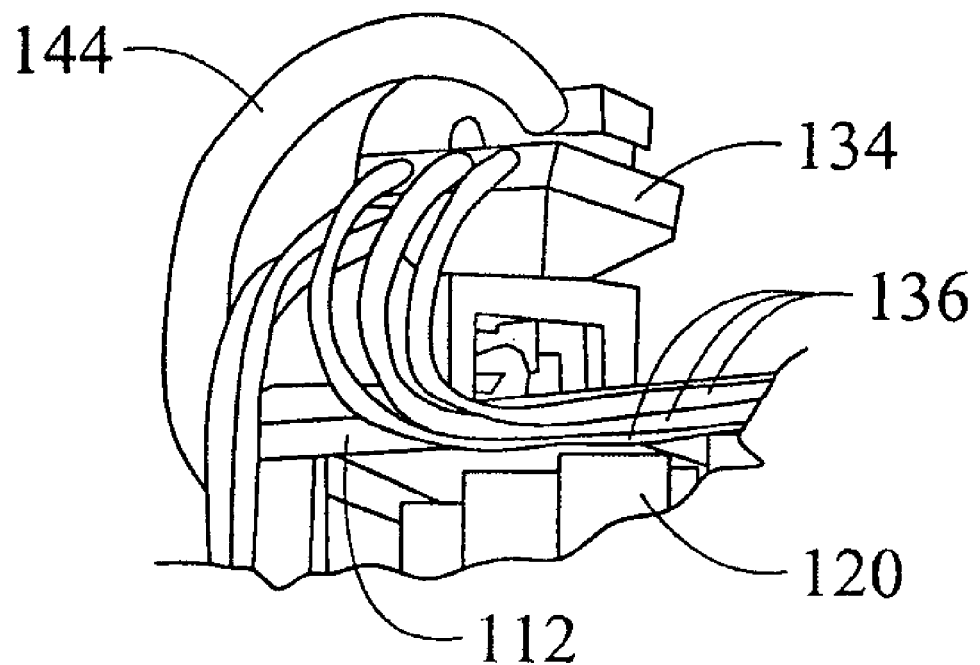
FIG. 8 is a perspective view of the mechanism for loading the storage device on the planter shown in FIG. 2.
Figure 9:
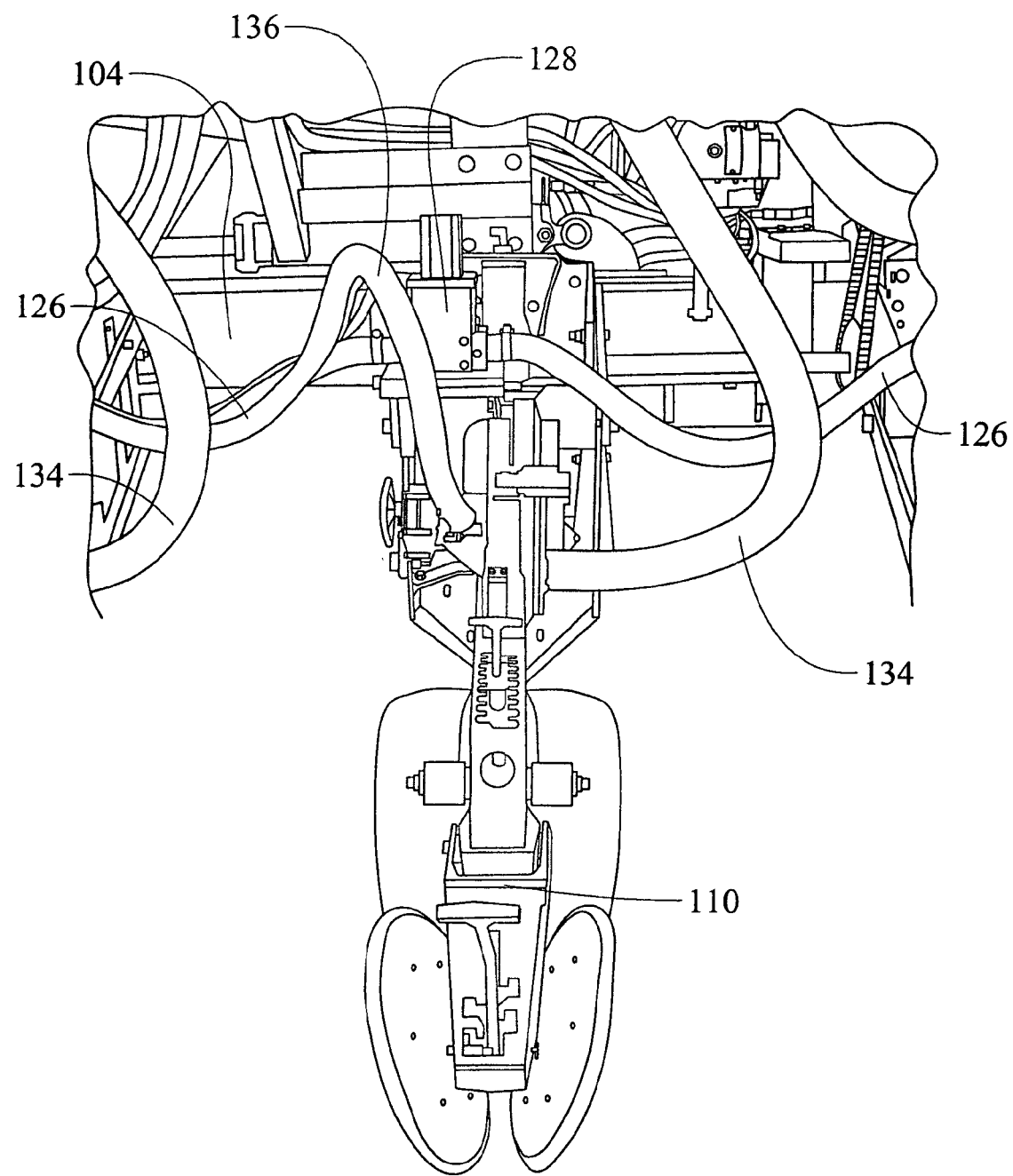
FIG. 9 is a rear elevation view of a planter unit on the planter shown in FIG. 2.
Figure 10:
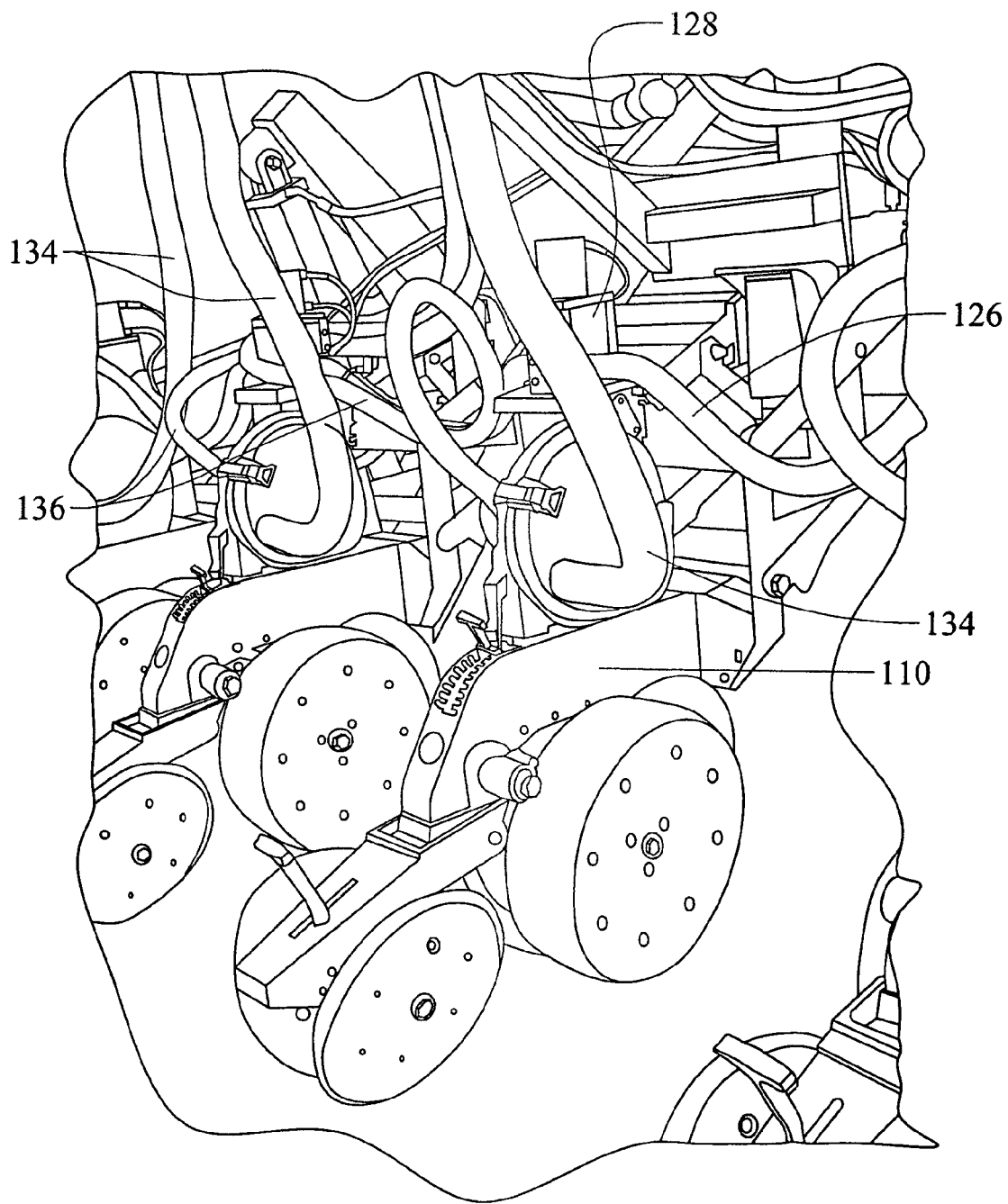
FIG. 10 is a right side elevation view of a planter unit on the planter shown in FIG. 2.
Figure 11:
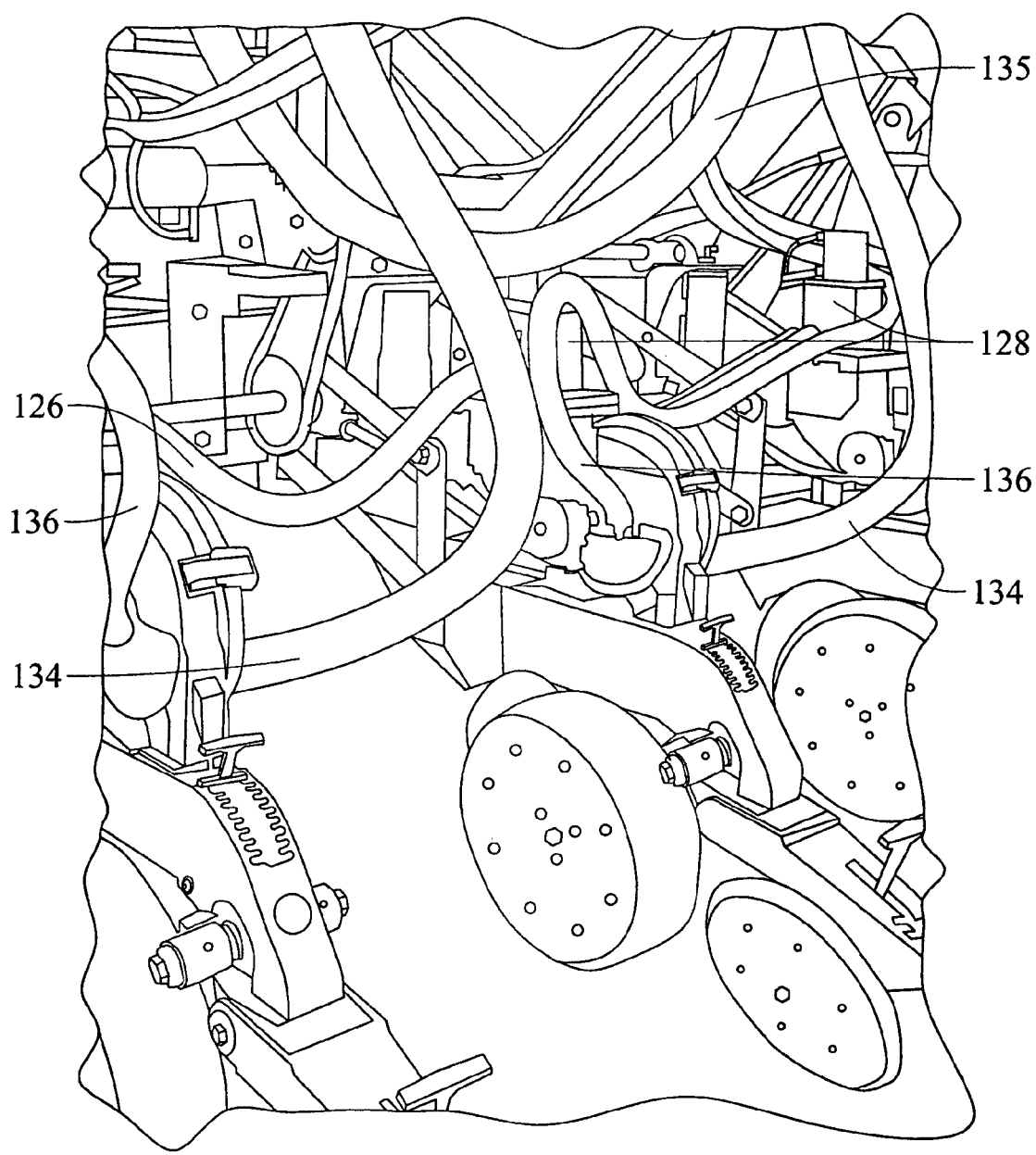
FIG. 11 is a left side elevation view of a planter unit on the planter shown in FIG. 2.
Figure 12:
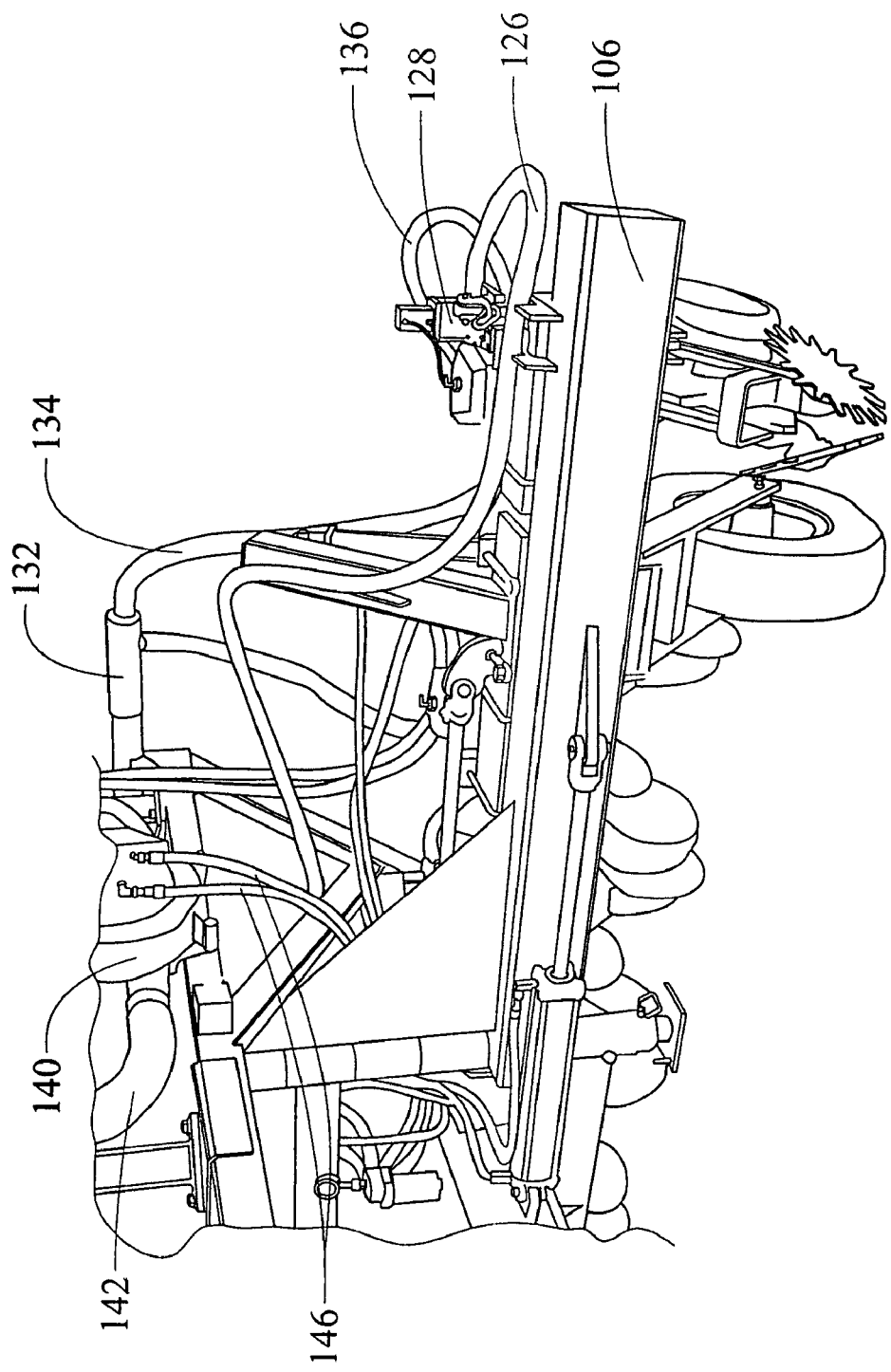
FIG. 12 is a front elevation view of left side of the planter shown in FIG. 2, showing the folding mechanism.
Figure 13:
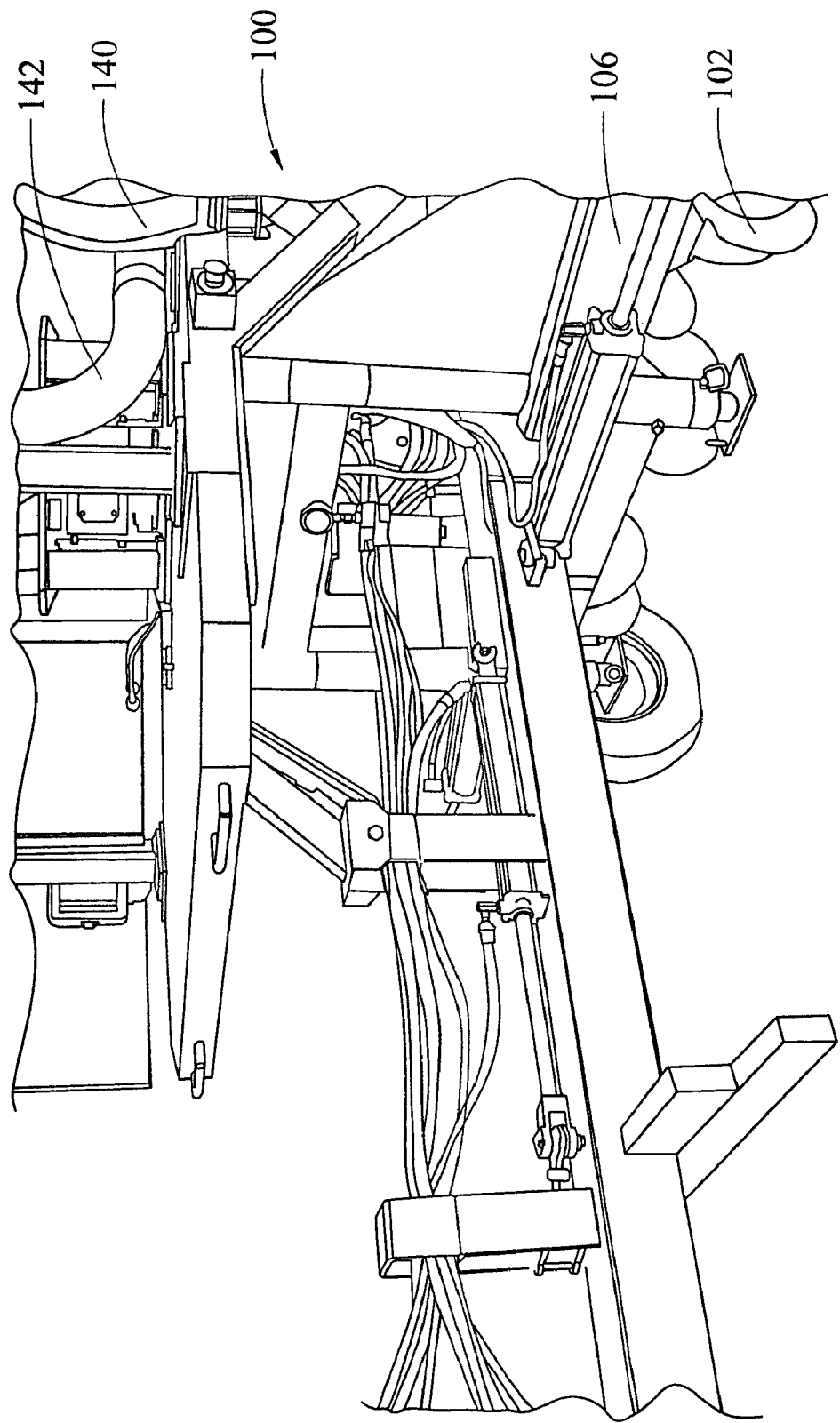
FIG. 13 is a left side elevation of the front portion of the planter shown in FIG. 2.
Figure 14:
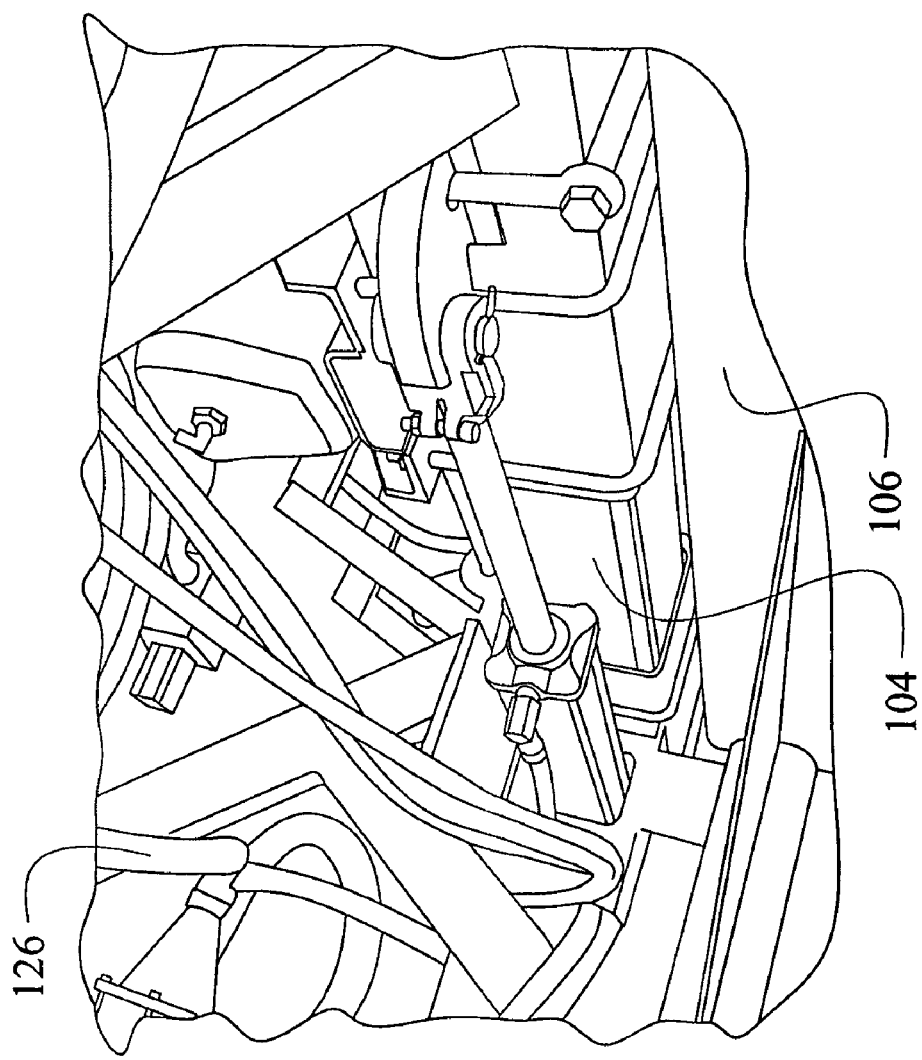
FIG. 14 is a top view of the left side of the planter shown in FIG. 2.
Figure 15:
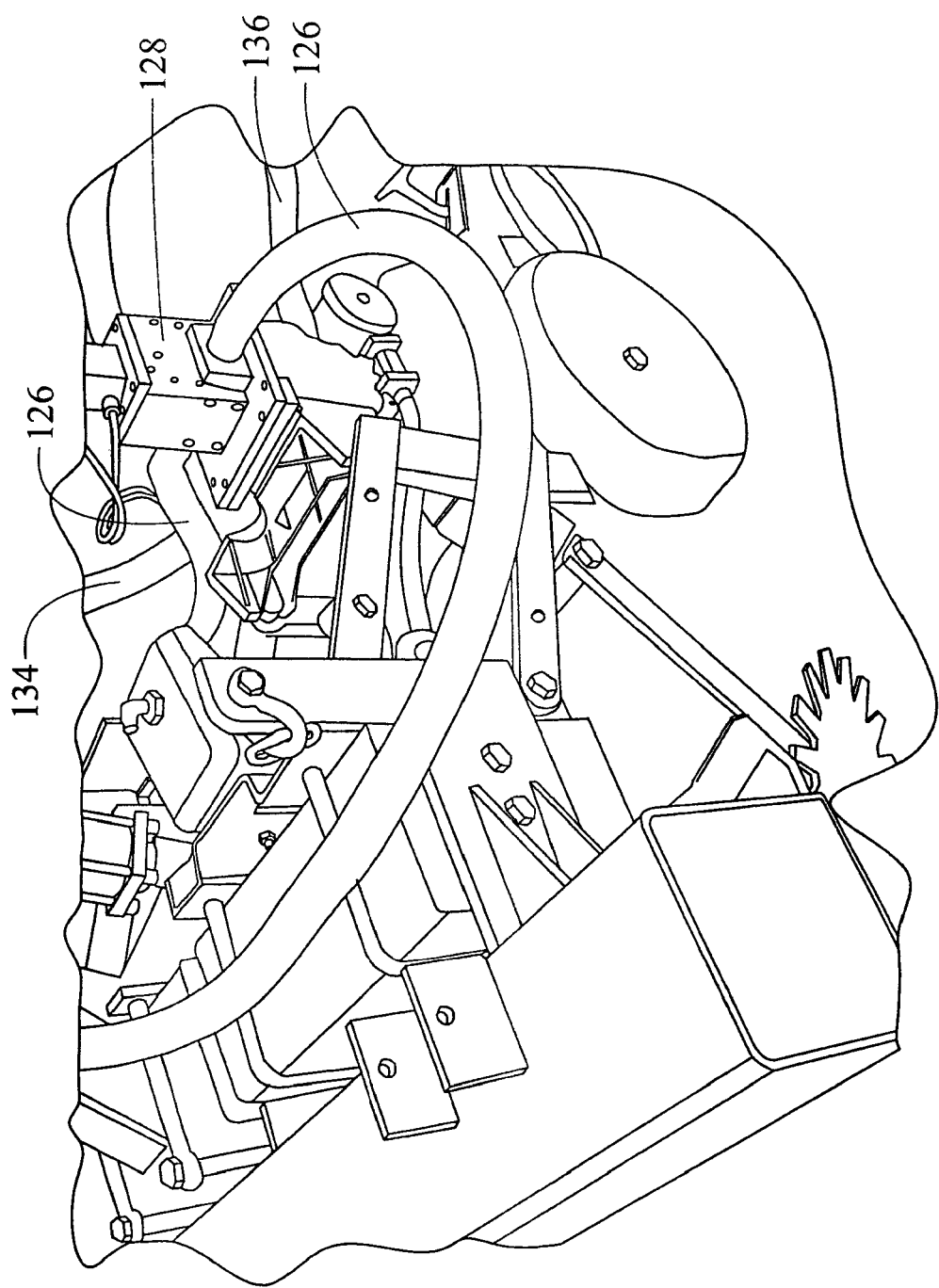
FIG. 15 is a perspective view of the right end of the planter shown in FIG. 2.
Figure 16:
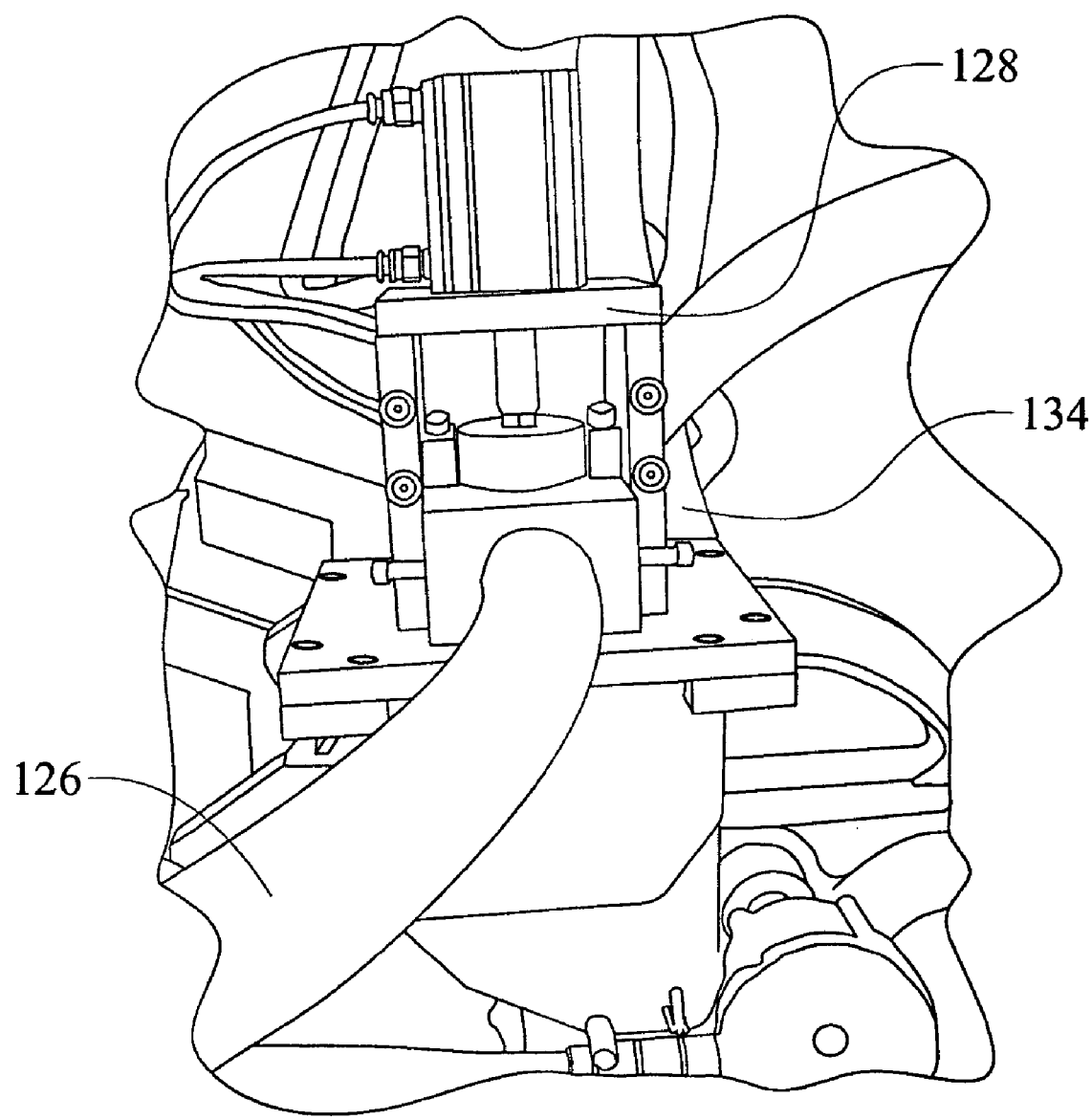
FIG. 16 is a side elevation view of a valve in the seed transport system on the planter shown in FIG. 2.
Figure 17:
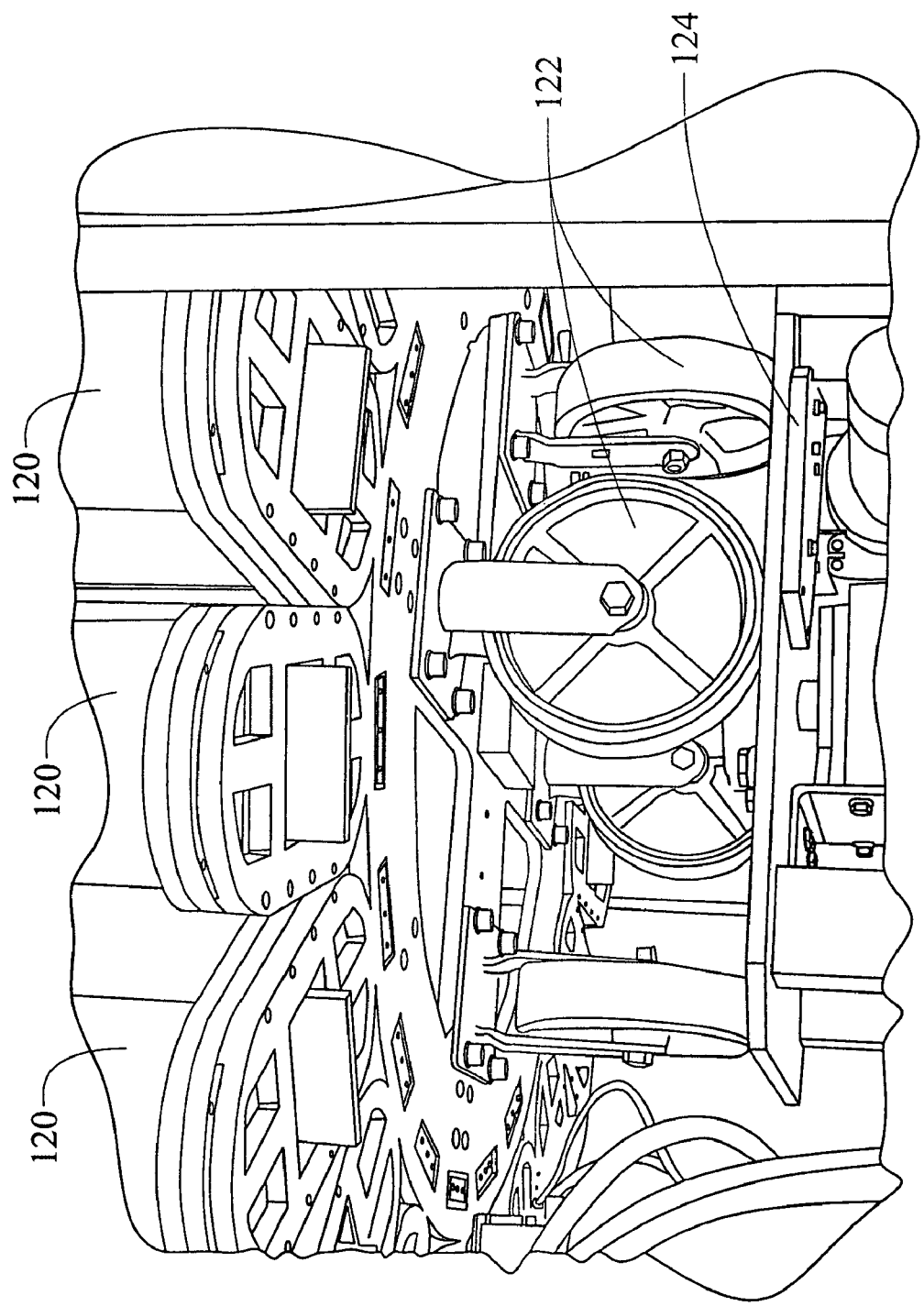
FIG. 17 is a side elevation view of the rotation mechanism on the storage device on the planter shown in FIG. 2.
Figure 18:
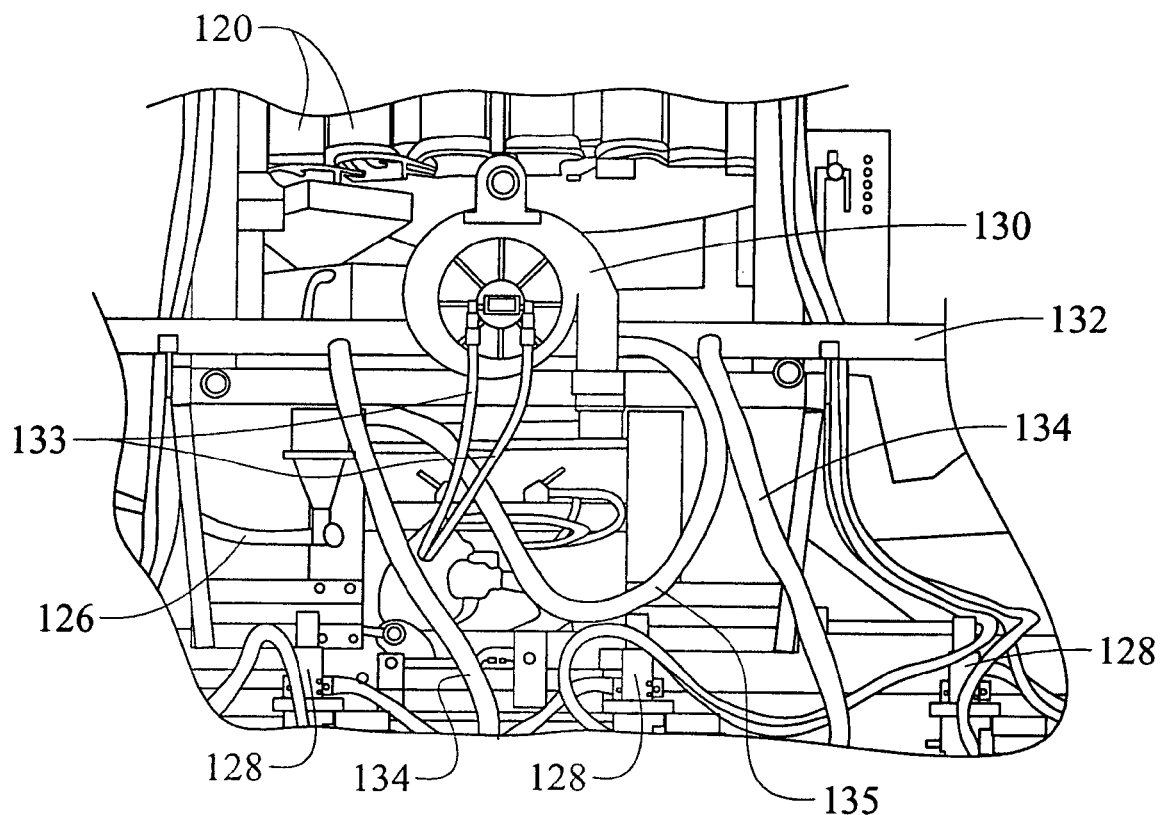
FIG. 18 is a rear elevation view of the planter showing the fan for seed transport system on the planter shown in FIG. 2.

A preferred embodiment of a planter constructed in accordance with the principles of this invention, indicated generally as 20, is shown schematically in FIG. 1. The planter 20 can be towed, or it can be incorporated on a tractor so that it is self propelled. Generally the planter 20 comprises a frame 22 with two extensible booms 24, 26. A plurality (eight in FIG. 1) of individual planter units 28 are mounted on the booms 24 and 26. The planter 20 also includes a seed storage device 30. The seed storage device 30 may be a 24-compartment rotating hopper, or some other device with sufficient capacity (both in number of seed types and in quantity).

A seed transportation system 32 transports seeds from a selected one of the compartments of the seed storage device 30. As shown in FIG. 1 the seed transportation system 32 comprises a plurality of tubes 34 extending between the storage device 30 and each of the individual planter units. A pneumatic system conducts seeds through the tubes 34. While the system illustrated in FIG. 1 shows parallel connections between the storage device and the individual planter units, the storage device could be connected to the individual planters in one or more series connections, in which case a valve may be provided to control the flow of seeds among the serially connected planter units. A seed transportation system 36 transports seeds from the individual planter units to the storage device. As shown in FIG. 1, the seed transportation system 36 comprises a plurality of tubes 38 extending between each of the individual planter units and the storage device 30. While the system illustrated in FIG. 1 shows parallel connections between the individual planter units and the storage system, the individual planter units can be connected to the storage device in one or more series connections, although a series return path generally is not as well suited for transporting seeds to the storage device, it is still comprehended by the present invention.

A planter constructed in accordance with the principles of the present invention is indicated generally as 100 in FIGS. 2-18. As shown in FIGS. 2-18, the planter 100 comprises a frame 102, and having transversely extending support member 104, and left and right pivotable support members 106 and 108. A plurality (six in FIGS. 2-18) of individual planter units 110 are mounted on the support members 104, 106 and 108. In this preferred embodiment four of the planter units 110 are mounted on the support member 104, and one planter unit 110 is mounted on each of the left and right pivotable support members. 106 and 108. The planter 100 is preferably configured to be collapsed or folded to a width of 102 inches or less so that it can met DOT standards and travel on conventional roads. Thus, in the preferred embodiment, the center two of the four planter units 110 on the support member 104 are fixedly mounted, and the planter units 110 on the left and right ends are mounted to translate toward the center the support members. The supports 106 and 108 are mounted to pivot about a vertical axis and swing forwardly. The planter units 110 on the supports 106 and 108 can pivot upwardly about a generally horizontal axis to stowed position.

The planter units 110 are preferably conventional planter units. In other preferred embodiments additional planter units may be provided to allow for planting up to twelve rows of corn. Additional planter units may also be provided to provide for planting soybeans as well. The units 110 are preferably adapted to handle both types of seeds or can be quickly converted to handle each type of seed.

The planter 100 also includes a superstructure 112 mounting a seed storage unit 114. The planter 100 also includes a seed transport system 116 for transporting seeds from the seed storage unit 114 to the planter units 110, and a seed transport system 118 for transporting seeds from the planter units 110 to the seed storage unit 114.

As shown in the Figures, the seed storage unit 114 comprises a plurality of hoppers 120 (40 as shown in the Figures). The hoppers 120 are mounted on a plurality of wheels 122 (FIG. 17) which roll on a platform 124 for rotation about a generally vertical axis. The hoppers 120 rotate to bring a particular hopper 120 into alignment with an inlet funnel 124 of the seed transport system 116. A conduit 126 extends from the funnel 124 and extends in series to each of the planters 110. The conduit 126 extends to a valve 128 mounted on each of the planters 110. Seeds from the hoppers 120 are drawn through the conduit 126, through each of the valves 128, to each of the planters 110. A blower 130 mounted on the superstructure 112 is connected to a manifold 132 extending transversely across the planter 100. A duct 134 extends from the manifold 132 to each of the planter units 110. The blower 130 is driven, for example by hydraulic power provided by hydraulic lines 133 or by electrical power, to create suction at each planter unit 110 via manifold 132 and duct 134. By opening the valves 128, the suction provided by the blower 130 at each planter unit 110 can draw seeds through the conduit 126 to each of the planter units. The blower 130 can also apply positive pressure to the conduit 126 via a duct 135 which extends between the outlet of the blower and the funnel 124.

The seed transport system 118 includes a plurality of conduits 136 extending from each of the planter units 110 to a funnel 138 above the hoppers 120. A second blower 140 mounted on the super structure 112, is connected to two ducts 142 and 144 which connect to the funnel 138 to draw air from the funnel, drawing air and seeds from the planter units 110 to the funnel, and back into the appropriate hopper 120. The second blower 140 can be driven hydraulically, with hydraulic lines 146.

Operation of the Planter 100

The planter 100 can be towed or transported on a trailer to the field where it is used. The planter 100 is adapted to be towed, for example by a conventional tractor. However, it would be preferable if the planter were incorporated into a conventional over the road vehicle, that could also be driven across fields.

The planter is prepared for use by rotating the planter units 110 on booms 106 and 108 into an operative position, and then pivoting supports 106 and 108 into alignment with support 104. The planter units 110 on the support 104 are translated to their operative positions. The supports 104, 106, and 108 are locked into operative position. The hydraulic lines 136 and 146 are connected to a supply of pressurized hydraulic fluid.

The hoppers 120 are rotated to bring the appropriate hopper 120 into alignment with the funnel 124. A gate at the bottom of the selected hopper 120 is operated to allow seed to flow into the funnel 124. When the appropriate amount of seed has been metered out, the gate is closed. The seeds in the funnel are distributed to each of the planter units 110. Blower 130 is operated to draw air from each planter unit, through the ducts 134 and the manifold 132. This draws seeds from the funnel 124 through the conduit 126 to the valves. The valves 126 are operated to load each planter unit 110 with seeds. Air pressure from the blower is also delivered to the funnel 124 via conduit 135 to facilitate the flow of seeds through the conduit 136 to the planter units. Once the individual planter units 110 are filled, the planter 100 operated across a field, each planter unit 110 planting a row of seeds. When the desired amount of seeds have been planted, each planter is emptied of seeds. This is conveniently down by operating blower 140, which draws air from the funnel 138 via ducts 142 and 144. This draws air and seeds from the individual planter units through conduits 136. The funnel 138 deposits the seeds back into the appropriate hopper 132. Once all of the seeds have been returned to the storage unite 114, another variety of seeds can be transported from one of the hoppers 120 to the planters, and the process repeated until all of the desired seed varieties have been planted.

Figure 19:
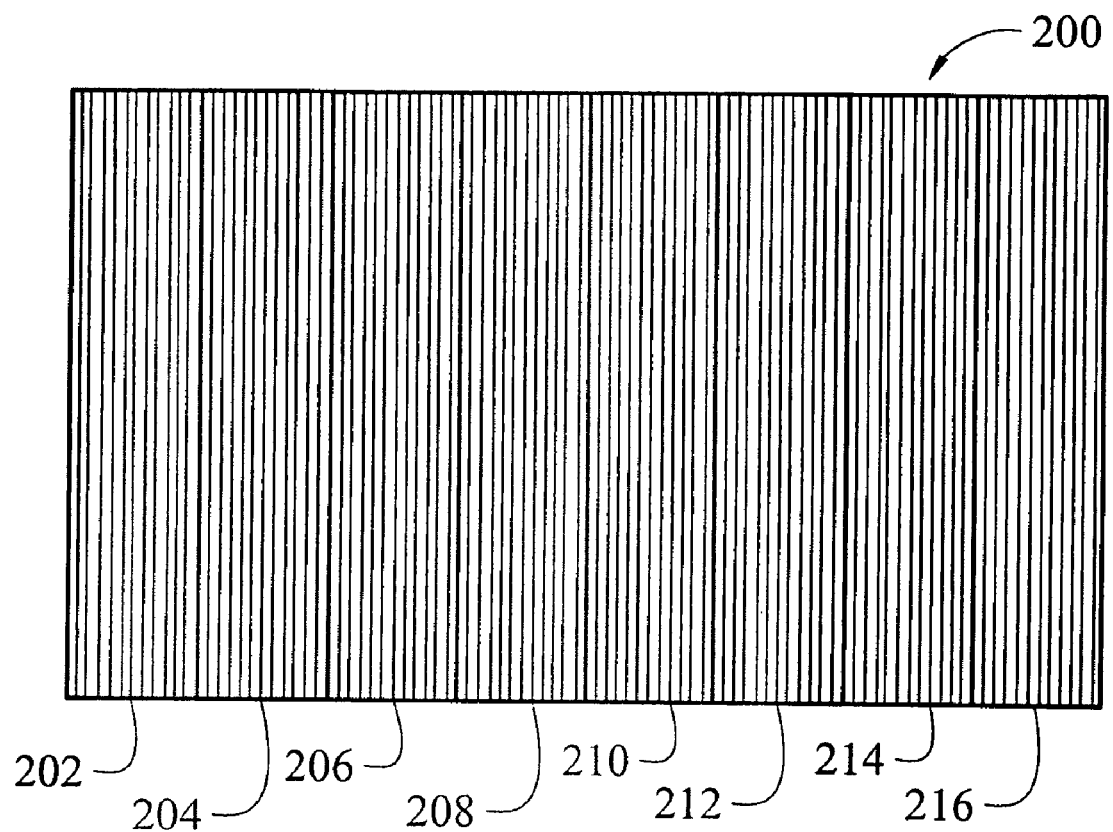
FIG. 19 is a schematic diagram of a field comprising a plurality of plots of different seed varieties.

Various embodiments of the planter and of the methods of this invention provide for and facilitate the planting of individual plots of different seeds in the same field. Thus, as illustrated schematically in FIG. 19, a field indicated generally as 200 can be planted as a plurality of individual plots 202, 204, 206, 208, 210, 212, 214, and 216. Each of the plots 202-216 preferably extends across the entire field 200 so that each plot can be planted with one or more complete passes across the field for convenience in planting. Each plot comprises a plurality of rows, for example 12. In the case of field testing, the center rows of each plot would typically be harvested for evaluation purposes, with the outer rows serving as protective barriers from adjacent plots.

Figure 20:
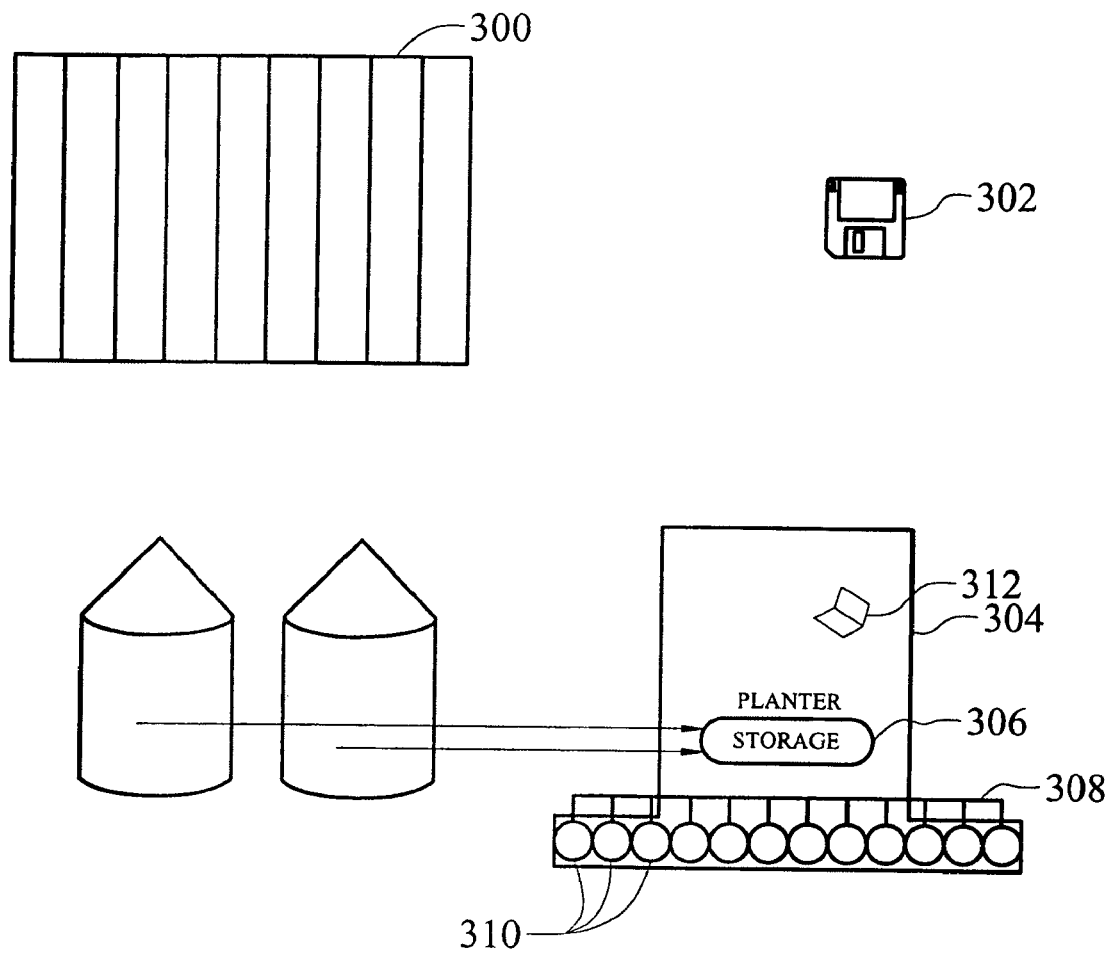
FIG. 20 is a schematic diagram of a preferred embodiment of a method in accordance with the principles of this invention.

A preferred embodiment of a method in accordance with the principles of this invention is shown schematically in FIG. 20. This method provides for the planting of plots of different seeds in a field, as is common in the testing of seed varieties. The ability to plant plots of different seeds also facilitates the tailoring of planting to local conditions within a field for optimum production. Thus seeds for the particular local soil and other conditions can be selected and planted within a field, rather than planting the entire field with a single variety of seed.

Broadly, the method of the preferred embodiment comprises loading a multi-row planter with a first seed type. The planter traverses the field (e.g. field 200 in FIG. 19) and planting a plot of the first seed in a portion of the field. After the first plot (e.g. 202 in FIG. 19) is planted, the seed remaining in the planter is automatically removed. A second seed is then automatically loaded into the planter. The planter again traverses the field, planting a second plot (e.g., 204 in FIG. 19). This process can be repeated for each variety of seed to be planted. This results in a field similar to field 200, comprising a plurality of plots 202-216.

In accordance with the preferred embodiment, the various seed types are stored separately on board the planter. The steps of loading each type of seed, and of unloading each type of seed preferably comprise transferring seed from and to an on-board storage system. This transfer can be accomplished by pneumatic or mechanical transfer system. In most testing applications, a plot will comprise one or more complete traverses across the field. In this case, the seeds can be changed as the planter is being turned at the end of one pass across the field, prior to making the next pass across the field, without the need to stop the planter or interrupt the planting operation. The transfers of seed can be initiated manually by an operator, or they can be initiated automatically, for example based on sensed movement of the planter and/or position of the planter (e.g. from GPS or from a local positioning system).

Test Planting

Some preferred embodiments of the methods of this invention are particularly adapted for planting test plots of at least two different seeds in a test field. An example is shown schematically in FIG. 20. In general, as indicated at 300 in FIG. 20, the method comprises preparing a predetermined planting plan of the at least two test plots in the test field. Nine such plots are shown in FIG. 20. This test plan preferably includes both the identities and the amount of each type of seed to plant. The plan can be manually prepared by the scientists conducting the test, or its preparation can be automated. As shown schematically at 302 in FIG. 20 a planter control program is prepared for controlling the operation of a planter in accordance with the predetermined planting plan. This planter control program is communicated to a processor on board the planter for execution to control the operation of the planter. The planter is operated across the field, and the planter control program is executed to automatically load the planter units with the appropriate seed before each pass and remove the seed after the completion of the pass, to plant the test fields in accordance with the predetermined planting plan 300.

A planter for carrying out the method, indicated generally as 304, is shown schematically in FIG. 20. The planter 304 comprises an on-board storage system 306, and a transfer system 308 for transferring seeds between the storage system and a plurality of individual planting units 310. The operation of the planter 304 (or at least the transfer system 308 of the planter) is under the control or a processor 312.

The seeds are preferably stored on board the planter in the storage system 306 with separate storage for each of the seeds specified in the predetermined planting plan. Before the planting, the storage system 306 is loaded with the specified seed in quantities sufficient to complete the predetermined planting plan, as indicating at 314. The storage system 306 could have a removable magazine which can be loaded separately and installed on the planter. These loaded magazines could be provided, for example from a central location where the predetermined planting plan and the control program are created. In implementation, the control program, which can be provided on magnetic, optical, or other media, or provided as a data stream through a wired (but preferably wireless) connection, and a pre-loaded magazine can be dispatched to the site of test, and installed on processor 312 on the planter 304. Alternatively, the planter 304 can be prepared with the appropriate control program and loaded with the appropriate seeds at a central location, and dispatched to the site.

The planter 304 is operated to make one or more passes across the field, and after a particular pass completes a plot the control program automatically removes the seeds for the completed test plot from the planter units and transfers the seed to the storage system 306 on board the planter 304. The control program then transfers the seeds for the next test plot from the storage device to the planter units. The planter 304 is operated to make one or more passes across the test field until a particular pass completes a plot. the control program then switches the seeds for the next plot, and the process continues until all of the plots are completed.

As shown and described herein each plot is assumed to constitute one or more complete passes across a field. However, a complete plot could include a partial pass across the field. This would be the case, for example, where seed is planted based upon local conditions within a field, and it is desirable to change seeds one or more times within a single pass.

Current methods of planting test patches are labor intensive, and in particular require substantial action in the field by highly educated test monitoring personnel. These personnel are responsible for designing the test program, and making sure that the proper seeds are planted in the proper locations. Embodiments of the present invention reduce the amount of labor required to execute test programs, and in particular the amount of skilled labor to execute test programs. Test plans for a plurality of fields scattered over a wide area can be created at a central location. Similarly a program for controlling the planter to implement the predetermined plan can also be developed at a central location. Lastly the seeds for implementing the plan can be assembled in a central location, or provided and loaded locally. Thus, all that is needed at the local test sites is someone who can operate the planter to traverse the test fields. The seeds simply have to be appropriately loaded into the storage device on the planter (or they can be provided preloaded in a magazine that is simply installed on the planter), and the control program uploaded. A relatively unskilled operator simply operates the planter to traverse the field.

In one embodiment the operator simply indicates to the system when each pass is completed, and the system automatically responds by changing the seeds at the appropriate pass. In another embodiment the system is motion or direction responsive and automatically changes the seeds based on movement or direction. In still another embodiment the system is GPS enabled, and automatically changes the seeds at the proper location, which may or may not be at the end of a pass. Furthermore, it is possible to completely automate the planting process, with control systems that can automatically traverse the planter across the field.

Instead of delivering the control program and seeds, the planter can be pre-programmed and pre-loaded, and delivered to local contactors to operate the planter in the designated test fields.

The transfer mechanism for transferring seeds between the storage unit and the planter units can be any system that quickly and reliable transfers seeds without damage. The system could be a mechanical system, but is preferably a pneumatic system that transfers seeds with air pressure. The transfer system can comprise separate loading and unloading systems. The loading system can comprise a plurality of pneumatic transfer tubes extending in parallel between the storage system and each planter unit. In the preferred embodiment, however, the loading system comprises a plurality of pneumatic transfer tubes extending in series between the storage system and some or all of the planter units. There pneumatic system preferably has at least two branches, with each branch extending in series to at least to planter units. The loading system could be used for unloading the system as well, or as in at least one preferred embodiment a separate unloading system can comprise a plurality of pneumatic transfer tubes extending in parallel between the storage system and each planter unit. The unloading system could alternatively comprise a plurality of pneumatic transfer tubes extending in series between the storage system and some or all of the planter units.

Figure 21:
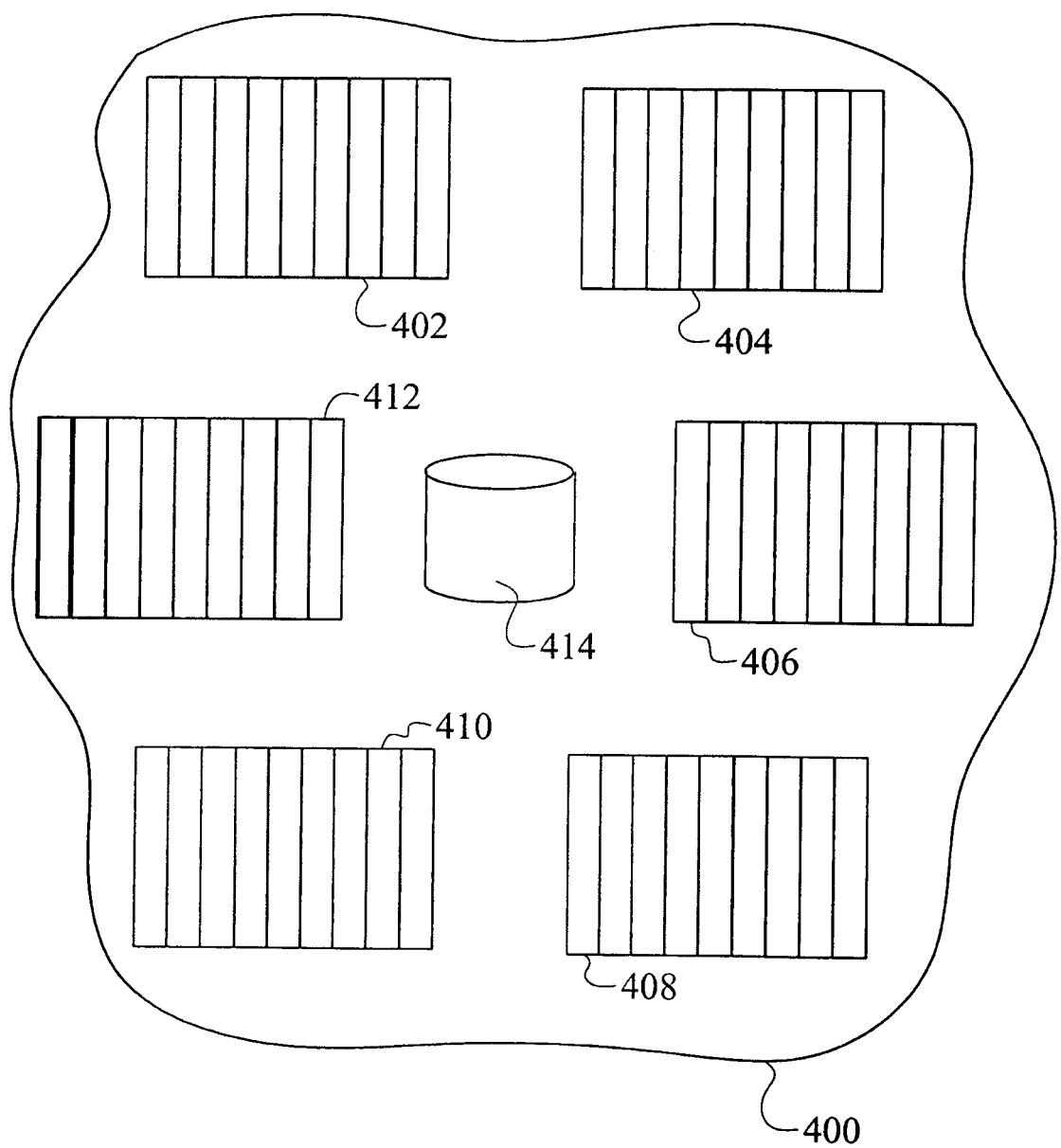
FIG. 21 is a schematic diagram of a test area comprising a plurality of test fields and served by a central distribution location, in accordance with the principles of this invention.

In large scale tests involving multiple test plots in multiples field throughout an area, the area is divided into at least two test regions, and a predetermined test plan is created for each region. As shown schematically in FIG. 21 one such region 400 comprises six fields 402, 404, 406, 408, 410, and 412. Test plans for each of the fields 402-412 are developed and sufficient seeds for the predetermined test plan are sent to a loading location 414 convenient to the region. At least one multi-row planter is provided in each region. Depending upon the location and timing, separate planters can be provided, or some or all of the planters can be used in more than one location. Each of the planters preferably comprises a plurality of planter units; a storage system for storing at least two types of seeds; and a transfer system for transferring seeds between the storage system and the planter units. The test plots are planted by (a) loading each planter at its respective loading location with seeds to complete at least some of the test plots in the test fields in its respective test region; and (b) operating the planter across the test fields in its respective region to plant test plots in its testing region, and repeating these steps until all of the test plots in the test area are completed.

At the storage location, the loading of the seeds into the planter or into a magazine for the planter can be done manually based on a print out or display for the particular portion of the predetermined plan that is being executed, or it can be automated. Where the loading is automated, the system can specify to the planter operator where to plant, or the planter operator can specify what fields will be planted next, and the appropriate types of seed, in the appropriate quantities can be automatically loaded into the planter.

Figure 22:
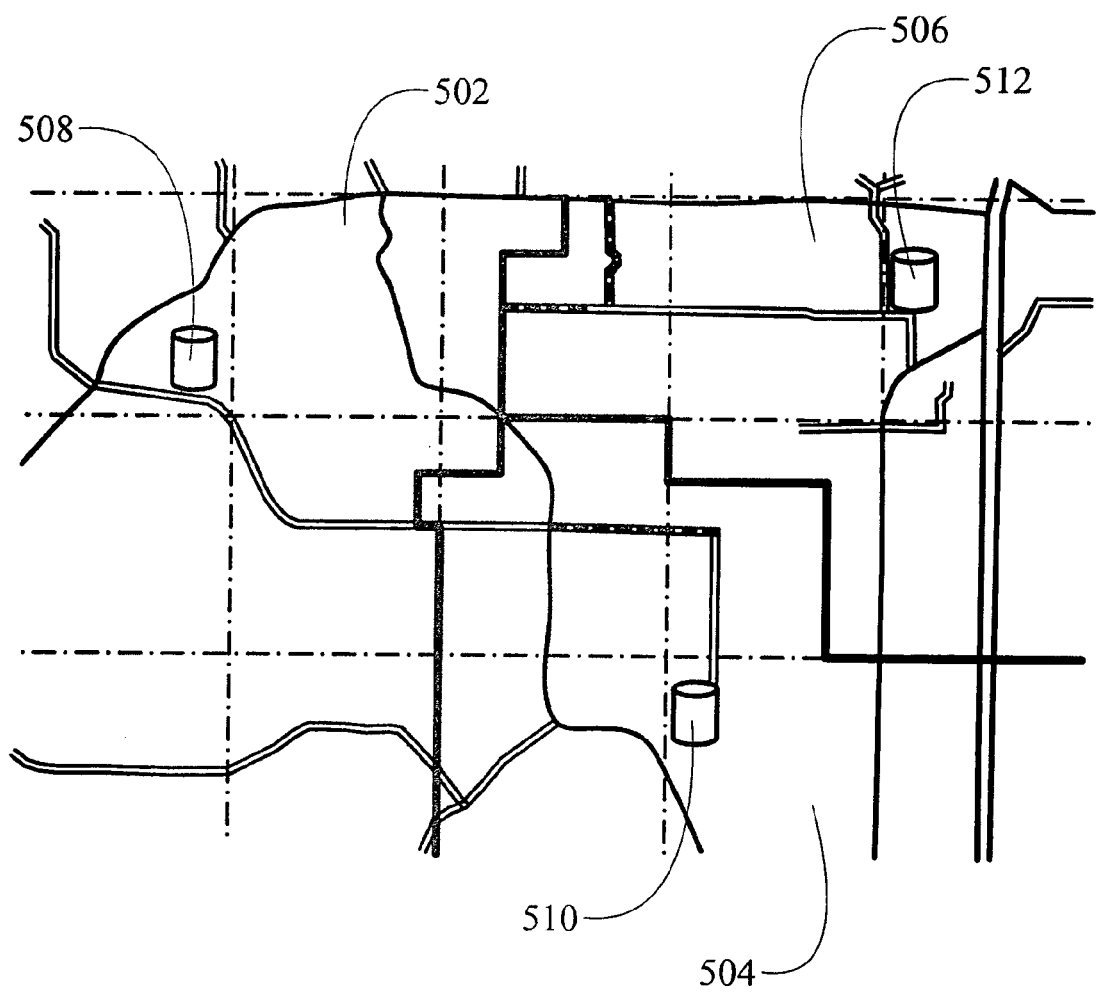
FIG. 22 is a schematic diagram of a test area broken down into a plurality of test regions, with designated distribution locations.

As shown in FIG. 22, an area can be divided into multiple test regions 502, 504, and 506, each having its own central loading location (508, 510, and 512, respectively) where the seed for the test and other support materials can be delivered and stored.

What is claimed is:

1. A method of planting test plots of different seeds in a field, the method comprising:
   loading a multi-row planter with a first seed, and traversing the field and planting a test plot of the first seed in a portion of the field; automatically removing the first seed from the multi-row planter and loading a second seed into the multi-row planter, and traversing the field and planting a test plot of the second seed in the field;
   wherein the first and second seeds are stored separately on board the planter, and wherein the step of automatically removing the first seed comprises putting the first seed removed from the planter in on-board storage, and wherein the step of loading the second seed comprises removing the second seed from on-board storage.

2. The method of planting according to claim 1 wherein the step of automatically changing from the first seed to the second seed occurs while the planter is being turned for a pass across the field.

3. The method of planting according to claim 1, further comprising automatically removing the second seed from the multi-row planter.

4. The method of planting according to claim 3, wherein the step of automatically removing the second seed comprises putting the second seed removed from the planter in on-board storage separate from the removed first seed.

5. The method of planting according to claim 1 wherein planting a test plot of the first seed includes planting the first seed in two or more rows using two or more planter units; and wherein planting a test plot of the second seed includes planting the second seed in two or more rows using the two or more planter units.

6. The method of planting according to claim 1, wherein the first seed is stored in a first on-board storage and the second seed is stored in a second on-board storage; wherein loading the multi-row planter with the first seed includes moving the first on-board storage into a loading position for loading the multi-row planter with the first seed; and wherein loading the multi-row planter with the second seed includes moving the second on-board storage into the loading position for loading the multi-row planter with the second seed.

7. The method of planting according to claim 6, wherein automatically removing the first seed includes putting the first seed removed from the multi-row planter in the first on-board storage; and wherein automatically removing the second seed includes putting the second seed removed from the multi-row planter in the second on-board storage.

8. The method of claim 1, further comprising preparing a planter control program for controlling operation of the multi-row planter in the field.

9. A method of planting a test field with a plurality of test plots of different seeds, the method comprising:
loading a first seed into a multi-row planter from an on-board seed storage device and making at least one pass across the field with the multi-row planter to make a test plot of the first seed; at the end of the at least one pass, removing the first seed from the multi-row planter to an on-board seed storage device and loading a second seed into the multi-row planter from an on-board seed storage device, and making at least one pass across the field to make a test plot of the second seed;
wherein the step of making at least one pass across the field with the multi-row planter to make a test plot of the first seed includes planting the first seed in two or more rows using two or more planter units; and
wherein the step of making at least one pass across the field with the multi-row planter to make a test plot of the second seed includes planting the second seed in two or more rows using the two or more planter units.

10. The method according to claim 9 wherein the steps of removing the first seed from the multi-row planter and loading a second seed into the multi-row planter are performed automatically.

11. A method of planting test plots of at least two different seeds in a test field, the method comprising the steps of:
preparing a predetermined planting plan of at least two test plots in the test field;
preparing a storage unit with separate storage for each of the seeds specified in the predetermined planting plan, by loading the storage unit with the specified seeds in quantities sufficient to complete the predetermined planting plan;
loading and unloading seeds to and from the storage unit and operating a planter in multiple passes across the test field to execute the predetermined planting plan;
wherein the storage unit is on board the planter;
wherein the storage unit comprises a removable portion, and wherein the step of preparing the storage unit comprises loading the removable portion of the storage unit while it is off board the planter.

12. A method of planting test plots of at least two different seeds in at least two test fields in a test region, the method comprising the steps of:
preparing a predetermined planting plan of at least two test plots in the at least two test fields;
preparing a storage unit with separate storage for each of the seeds specified in the predetermined planting plan, by loading the storage unit with the specified seeds in quantities sufficient to complete the predetermined planting plan;
loading and unloading seeds from the storage unit to and from two or more planting units and operating a planter in multiple passes across each of the at least two test fields to execute the predetermined planting plan.

13. The method according to claim 12 wherein the storage unit is on board the planter.

14. The method according to claim 13 wherein the step of preparing the storage unit comprises loading the storage unit while it is on board the planter.

15. The method according to claim 13 wherein the storage unit comprises a removable portion, and wherein the step of preparing the storage unit comprises loading the removable portion of the storage device while it is off board the planter.

16. A method of planting test plots of at least two different seeds in a test field in a test region, the method comprising the steps of:
preparing a predetermined planting plan of at least two test plots in the test field;
storing the seeds specified in the predetermined planting plan at a distribution center convenient to the test region. in quantities sufficient to complete the planting plan;
at least one time preparing a storage unit with separate storage for each of the seeds specified in the predetermined planting plan, by loading the storage unit with the specified seeds in quantities sufficient to complete at least a portion of the predetermined planting plan at the distribution center;
loading and unloading seeds to and from the storage unit and operating a planter in multiple passes across the test field to execute the predetermined planting plan;
wherein the storage unit is on board the planter;
wherein the storage unit comprises a removable portion, and wherein the step of preparing the storage unit comprises loading the removable portion of the storage unit while it is off board the planter.

17. A multi-row planter adapted for planting at least two different types of seeds, the planter comprising:
a storage system for storing at least two different types of seeds;
a plurality of planting units each adapted for planting seeds in a row;
a transfer system for transferring seeds between the storage system and the plurality of planting units;
a control for controlling the transfer system to transfer seeds from the storage system to the planting units and from the planting units to the storage system to change the type of seeds being planted by the planter.

18. The multi-row planter according to claim 17 wherein the controller controls the transfer system based upon location of the planter.

19. The multi-row planter according to claim 18 wherein the controller receives GPS information about the location of the planter.

20. The multi-row planter according to claim 18 wherein the controller receives location information from manual inputs.

21. The multi-row planter according to claim 17 wherein the controller controls the transfer system based upon location of the planter and relative to a predetermined plan.

22. The multi-row planter according to claim 17 wherein the transfer system comprises a pneumatic system for pneumatically transferring seeds from the storage system to the plurality of planting units.

23. The multi-row planter according to claim 22 wherein the pneumatic system extends in series to each of the plurality of planting units.

24. The multi-row planter according to claim 23 wherein the pneumatic system comprises at least two branches, each branch extending in series to at least two planting units.

25. The multi-row planter according to claim 22 wherein the transfer system comprises a pneumatic system for conveying seeds from the planting units to the storage system.

26. The multi-row planter according to claim 25 wherein the pneumatic system extends in parallel to at least two planting units.

27. A method of efficiently planting test plots of different seeds in a test field, the method comprising:
    preparing a predetermined planting plan for the test plots in the test field;
    preloading a seed storage device on a multi-row planter with a plurality of seeds for the test plots in the predetermined planting plan;
    traversing the multi-row planter across the test field;
    transferring seeds from the storage device to planting units of the multi-row planter to enable the multi-row planter to plant seeds in the test plots in accordance with the predetermined planting plan; and
    transferring seeds from the planting units of the multi-row planter to said storage device.

28. A method of planting multiple test plots in multiple test fields throughout an area with at least two different types of seeds, the method comprising:
    dividing the area into at least two test regions;
    creating predetermined test plans for each region;
    sending sufficient seeds for the predetermined test plans to a loading location convenient to each region;
    providing in each region at least one multi-row planter having a plurality of planter units; a storage system for storing at least two types of seeds; and a transfer system for transferring seeds between the storage system and the planter units;
    planting test plots by repeating the following steps until all of the test plots in the at least two regions have been planted:
    (a) loading each multi-row planter at its respective loading location with seeds to complete at least some of the test plots in the test fields in its respective test region; and
    (b) operating each multi-row planter across the test fields in its respective region to plant test plots in its testing region.

29. The method according to claim 28 wherein each multi-row planter operates to automatically follow its predetermined test plan as it is traversed across the test fields.

30. The method according to claim 28 wherein each multi-row planter operates automatically in response to position information to follow its predetermined test plan as the multi-row planter traverses the test fields.

31. The method according claim 28 wherein the step of loading each multi-row planter is performed automatically in response to input of test fields in which to plant.

* * * * *